(12) United States Patent
Boecker et al.

(10) Patent No.: US 11,662,032 B2
(45) Date of Patent: May 30, 2023

(54) CONICAL ROTATION VALVE (71) Applicant: TI Automotive Technology Center GmbH, Rastatt (DE)

(72) Inventors: Albert Boecker, Ettlingen (DE);
Matthias Winter, Rastatt (DE);
Thorsten Schaefer, Steinfeld (DE);
Florian Deibel, Sinzheim (DE);
Matthias B. Olbrich, Rastatt (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

(21) Appl. No.: 17/541,354

(22) Filed: Dec. 3, 2021

(65) Prior Publication Data
US 2022/0178453 A1   Jun. 9, 2022

(30) Foreign Application Priority Data
Dec. 3, 2020 (EP) .................................. 20211671

(51) Int. Cl.
| | | |
|---|---|---|
| *F16K 11/08* | (2006.01) |
| *F16K 11/083* | (2006.01) |
| *F16K 27/06* | (2006.01) |
| *F28F 27/02* | (2006.01) |
| *F16K 11/078* | (2006.01) |

(52) U.S. Cl.
CPC ........ *F16K 11/0833* (2013.01); *F16K 27/062* (2013.01); *F28F 27/02* (2013.01); *F16K 11/078* (2013.01)

(58) Field of Classification Search
CPC .. F16K 11/078; F16K 11/0833; F16K 27/062; F16K 3/267; F16K 11/0785; F16K 27/12; F16K 11/0836; F16K 31/535; F16K 31/563; F28F 27/02
USPC ....... 251/230, 252, 253, 251, 297, 163, 218, 251/215, 229, 262, 263, 292, 79, 81; 137/625.4, 625.41, 625.17, 625.46, 137/625.47, 625.19, 375
See application file for complete search history.

(56) References Cited

U.S. PATENT DOCUMENTS

| | | | | |
|---|---|---|---|---|
| 699,818 | A * | 5/1902 | Rylands ................. | F16K 35/04 251/192 |
| 886,012 | A * | 4/1908 | Paul ....................... | A47J 27/18 99/368 |
| 886,013 | A * | 4/1908 | Paul ........................ | A23L 3/10 99/368 |
| 955,611 | A * | 4/1910 | Stevens .................. | B60T 17/18 251/181 |
| 1,240,472 | A * | 9/1917 | Mitchell ................. | F16K 35/04 251/297 |
| 1,250,918 | A * | 12/1917 | MacMichael ........... | B01F 23/50 417/165 |

(Continued)

*Primary Examiner* — Craig J Price
(74) *Attorney, Agent, or Firm* — Dickinson Wright PLLC (57) ABSTRACT

A rotary valve, comprising a valve housing with a valve chamber, wherein the valve chamber has a chamber wall in which at least two fluid openings are provided, wherein the valve chamber has a receiving opening on the end face side, wherein the valve chamber accommodates a valve core, wherein the valve core is provided with a channel structure which interacts with the fluid openings, wherein the valve core is supported in the valve chamber in a rotationally movable manner, wherein the valve chamber is formed in a conical shape.

15 Claims, 11 Drawing Sheets

(56) References Cited

U.S. PATENT DOCUMENTS

| | | | | |
|---|---|---|---|---|
| 1,282,650 A * | 10/1918 | Studdard | ............... | F02M 1/00 |
| | | | | 123/576 |
| 1,558,979 A * | 10/1925 | Guillery | ............... | F16K 5/162 |
| | | | | 137/625.43 |
| 1,578,383 A * | 3/1926 | Bayles | ............... | B25D 9/16 |
| | | | | 251/297 |
| 2,261,596 A * | 11/1941 | Stroobants | ............... | F24D 19/0002 |
| | | | | 165/DIG. 126 |
| 2,416,814 A * | 3/1947 | Borse | ............... | F16K 27/062 |
| | | | | 251/297 |
| 2,662,722 A * | 12/1953 | Graziano | ............... | F16K 5/162 |
| | | | | 277/391 |
| 6,186,174 B1 * | 2/2001 | Yurchision | ............... | F16K 3/10 |
| | | | | 137/625.46 |
| 7,341,239 B2 * | 3/2008 | Hodel | ............... | F16K 31/52416 |
| | | | | 239/449 |
| 8,276,833 B2 * | 10/2012 | Cheng | ............... | E03C 1/0409 |
| | | | | 239/443 |
| 9,958,082 B2 * | 5/2018 | Yu | ............... | F16K 31/041 |

* cited by examiner

CONICAL ROTATION VALVE

RELATED APPLICATIONS

The present disclosure is a national phase application of European Application 20211671.1, filed on Dec. 3, 2020, the entire contents of each of which are incorporated herein by reference.

FIELD

The present disclosure relates to a rotary valve, comprising a valve housing with a valve chamber, wherein the valve chamber has a circumferential wall in which at least two fluid openings are provided, wherein the valve chamber has a receiving opening on the end face side, wherein the valve chamber receives a valve core, wherein the valve core is provided with a channel structure which interacts with the fluid openings, wherein the valve core is supported in the valve chamber in a rotationally movable manner.

BACKGROUND

Such a rotary valve is known, for example, from DE 10 2018 009 680 A1. Rotary valves of the type mentioned are often used in cooling circuits to control the flow of coolant. A cooling fluid can flow in and out through the fluid openings provided in the valve housing. The channel structure provided in the valve core controls the coolant flow, wherein, depending on the design and number of fluid openings, different cooling circuits can be activated, the volume flow can be regulated, or the flow direction adjusted.

The design as a rotary valve is advantageous because the coolant flow is adjusted by rotating the valve core, wherein the corresponding actuator for rotating the valve core is designed in a simple manner and can be easily controlled. Accordingly, rotary valves and the associated actuators can be manufactured in a cost-effective manner. In addition, rotary valves require only little installation space.

It is also known to form the elements of the rotation valve from plastic. However, the problem can arise that high frictional forces and thus increased wear occur in the case of a sealing contact between the valve core and the valve housing due to the required contact pressure. If, on the other hand, the valve core is arranged in the valve housing with a clearance, the forces required for rotation and the wear are reduced, but undesirable leakage can occur via the gap between the valve housing and the valve core.

Such rotary valves are particularly advantageous with regard to use in temperature control circuits in the field of electromobility. To achieve a high range for electric vehicles, for example, it is necessary to control the temperature of electrical components. Electric vehicle components whose temperatures need to be controlled are especially accumulators, but also the power electronics or plug connections of fast charging devices. An accumulator has a best possible capacity only in a very small temperature spectrum. Therefore, it is necessary to heat accumulators of electric vehicles at low ambient temperatures and to cool them at high outside temperatures or at a high load demand.

For this purpose, it is known to provide a temperature control circuit through which a temperature control medium flows. Depending on the requirements, the temperature control medium can either be heated in a heating device or cooled in a cooling device. The flow of the temperature control medium can be controlled by rotary valves.

BRIEF SUMMARY

It is the object of the disclosure to provide a rotary valve which features easy adjustability with low leakage and with low wear.

This task is solved by the features of claim 1. The subclaims refer to advantageous embodiments.

The rotary valve according to the disclosure comprises a valve housing with a valve chamber, wherein the valve chamber has a circumferential wall in which at least two fluid openings are provided, wherein the valve chamber has a receiving opening on the end face side, wherein the valve chamber accommodates a valve core, wherein the valve core is provided with a channel structure which interacts with the fluid openings, wherein the valve core is supported in the valve chamber in a rotationally movable manner, wherein the valve chamber is formed in a conical shape.

The valve core is preferably formed to be congruent with the valve chamber and is also formed in a conical shape on the outside. This allows the valve core to be mounted in the valve housing in such a way that there is only a very small gap between the valve core and the valve housing, which reduces the risk of leakage.

The valve chamber is preferably delimited by a chamber wall and a chamber bottom, wherein the chamber wall surrounds the valve core, wherein the diameter of the chamber wall widens, starting from the chamber bottom, towards the receiving opening. Here, it is advantageous that the valve core is mountable into the valve chamber in a particularly simple manner. In this embodiment, the outer periphery of the valve core does not come into contact with the chamber wall until the valve core is fully pushed into the valve chamber. This simplifies the assembly of the rotary valve because the valve core and the valve housing do not touch each other until the valve core is fully pushed into the valve housing. This can also prevent components of the valve core, such as the channel structure, from being damaged during assembly.

The boundaries of the valve core on the side of the outer circumference can abut directly against the chamber wall of the valve housing. However, it is also conceivable that the boundaries of the valve core on the side of the outer circumference, in particular in the region of the channel structure, are provided with a sealing contour.

Preferably, the valve core is supported translationally in the valve chamber. In this embodiment, during operation, the valve core may perform a purely rotational movement, a purely translational movement, or a superimposed translational and rotational movement. In a superimposed translational and rotational movement, the valve core is moved translationally, wherein the valve core is spaced from the chamber wall due to the conical design of the valve chamber and valve core. This creates a gap which allows the valve core to rotate relative to the valve housing with negligible friction.

An adjustment of the valve core is preferably carried out in such a way that first a translational movement is carried out, wherein the valve core is spaced apart from the chamber wall of the valve housing, then a rotational movement of the valve core is carried out, so that the channel structure is aligned with the fluid openings in the desired manner, simultaneously, another translational movement can be performed, and finally, another translational movement is performed, wherein the valve core is reinserted into the valve housing in such a way that the outer circumference of the valve core abuts against the chamber wall of the valve housing with virtually no gap. On the one hand, this makes it possible to adjust the valve core with low wear and low friction. Furthermore, fluid can be transported via the openings of the valve housing and the channel structure of the valve core while avoiding leakage.

The valve core can accommodate a selector shaft. The selector shaft preferably extends through the central axis of the rotationally symmetrical valve core. The selector shaft can be operatively connected to an actuator which can perform a superimposed rotational and translational movement to adjust the valve core.

Accordingly, the selector shaft can be movable rotationally and translationally. In this case, the selector shaft may be supported in the valve housing, wherein a support is preferably provided when the valve core is fully pushed into the valve housing. If, on the other hand, the valve core is spaced apart from the valve housing due to a translational movement, a support is not necessarily required. According to a first alternative embodiment, the selector shaft is rotationally movable and according to a second alternative embodiment, the selector shaft is translationally movable.

In the case of the first alternative, the valve core is rotated by the selector shaft during a switching operation and the translational movement is performed automatically by devices associated with the valve core and the valve housing. This can be achieved, for example, by means of an adjustment device moulded into the valve core and the chamber bottom in the form of a circumferential mountain and valley structure.

In the case of the second alternative, the valve core is moved translationally by the selector shaft and the rotational movement is performed automatically by devices associated with the valve core and the valve housing. This can be achieved, for example, by means of an adjustment device in the form of a locking and tensioning mechanism arranged between the valve core and the valve housing.

The selector shaft may be provided with a first detent arrangement and the valve core may be provided with a second detent arrangement, wherein the first detent arrangement and the second detent arrangement are operatively connected. The detent arrangements result in discrete positions of the valve core relative to the selector shaft, again ensuring correct association of the channel structure to the fluid openings. In this case, the positioning of the valve core relative to the valve housing can be carried out independently of an actuator arranged outside the rotary valve. This means that the actuator which moves the valve core can be designed in a particularly simple and cost-effective manner. The position of the valve core is predetermined by the detent arrangement arranged inside the rotary valve, so that it is not necessary to align an actuator arranged on the outside of the rotary valve with the rotary valve and/or the switching positions in order to adjust and/or calibrate the rotary valve.

The first detent arrangement and the second detent arrangement may provide a superimposed rotational and translational movement. For this purpose, the two detent arrangements can be designed in such a way that the valve core automatically performs a rotational movement when the valve core has been moved translationally via the selector shaft. This allows a particularly simple design of the actuator moving the selector shaft, and a rotational movement takes place that is predetermined by the detent arrangements.

The first detent arrangement can be star-shaped and have ramp elements projecting radially from the selector shaft. The second detent arrangement is preferably integrally moulded into the valve core as a single piece of material and is formed congruently with the first detent arrangement. The ramp elements cause the valve core to move along these ramp elements as soon as the valve core has been moved translationally via the selector shaft. For each translational movement out of the valve housing, the valve core performs a defined rotational movement, wherein the angular dimension results from the length of the ramp elements.

Preferably, a spring is provided which automatically presses the valve core against the chamber bottom. This ensures that the valve core is positioned correctly in relation to the valve housing and, in particular, presses the valve core into the valve housing after switching operations.

The valve housing may be surrounded by a collector. In this case, the collector can simultaneously form the outer wall of the valve housing. There may be a gap between the chamber wall, which is formed from the valve housing, and the collector. This makes the rotary valve particularly light on the one hand, but also mechanically stable on the other.

The valve housing and/or the valve body may be formed as an injection moulded part. As a result, both the valve housing and the valve body can be manufactured in a cost-effective manner. The collector can be designed as a blow-moulded part. This allows the collector to have a complex outer geometry, but at the same time be cost-effective to manufacture.

The valve housing, the valve body and/or the collector are preferably made of plastic. Preferably, an injection mouldable thermoplastic material is used. This results in a rotary valve that can be manufactured in a cost-effective manner. Preferred materials for the valve housing and valve core are selected from polyoxymethylene (POM), polyphenylene sulfide (PPS) or polyamide (PA) plastics. The plastics may be provided with additives, for example a fibre reinforcement based on glass fibres. The selector shaft is preferably formed of fibre-reinforced plastic material. Alternatively, the selector shaft can also be formed of metallic material. The collector is preferably formed of polypropylene (PP). Insofar as the valve core is provided with a sealing contour on the side of the outer circumference in the region of the channel structure, it is in particular conceivable that the sealing contour is formed from thermoplastic elastomer and the valve core is produced by two-component injection moulding.

The fluid openings are preferably designed as connecting pieces. The connecting pieces are suitable for accommodating fluid lines in the form of pipes and/or hoses. These can then be easily and cost-effectively connected to the rotary valve.

A temperature control circuit according to the disclosure comprises at least one rotary valve of the type described above. In such an arrangement, the temperature control circuit can control the temperature of one or more components of an electric vehicle, for example a battery, power electronics or a line or connector component. Such components exhibit optimum performance only within a limited temperature interval and must be heated or cooled accordingly, depending on ambient conditions and performance requirements.

Accordingly, the temperature control device may comprise a heating device and a cooling device in addition to a conveying device. The components, whose temperature needs to be controlled, the heating device and the cooling device are controlled via the rotary valve.

BRIEF DESCRIPTION OF THE DRAWINGS

Some embodiments of the rotary valve according to the disclosure are explained in more detail below with reference to the figures. These show, each schematically.

DETAILED DESCRIPTION

The figures show a rotary valve 1 as part of a cooling circuit of a device to be climate controlled. Preferably, the rotary valve 1 is used in electromobility applications. In this context, the rotary valve 1 can be integrated into a temperature control circuit of an electric motor drive of an electric vehicle and can, for example, control the temperature of accumulators, electric motors, the power electronics, or the like. The rotary valve 1 can be used to modify coolant flows of the temperature control circuit. In this context, it is conceivable to modify the volume flow of the coolant, that is, to increase or decrease it. Furthermore, by changing the valve position of the valve core, the flow direction of the coolant can be changed. Finally, various components of the devices whose temperature needs to be controlled can be selectively supplied with coolant or cut off from the coolant supply. Depending on the ambient temperature and power requirements, for example, a coolant flow can initially be directed exclusively to the accumulators, where it can cool or heat the accumulators depending on the ambient temperatures. For high power requirements, a flow of coolant can be directed to the power electronics and also to the electric motors to cool these components. The modification of the coolant flow takes place by means of the rotary valve 1. In this case, the rotary valve 1 can replace several solenoid valves, so that the temperature control circuit can be produced in a cost-effective manner.

Figure 1:
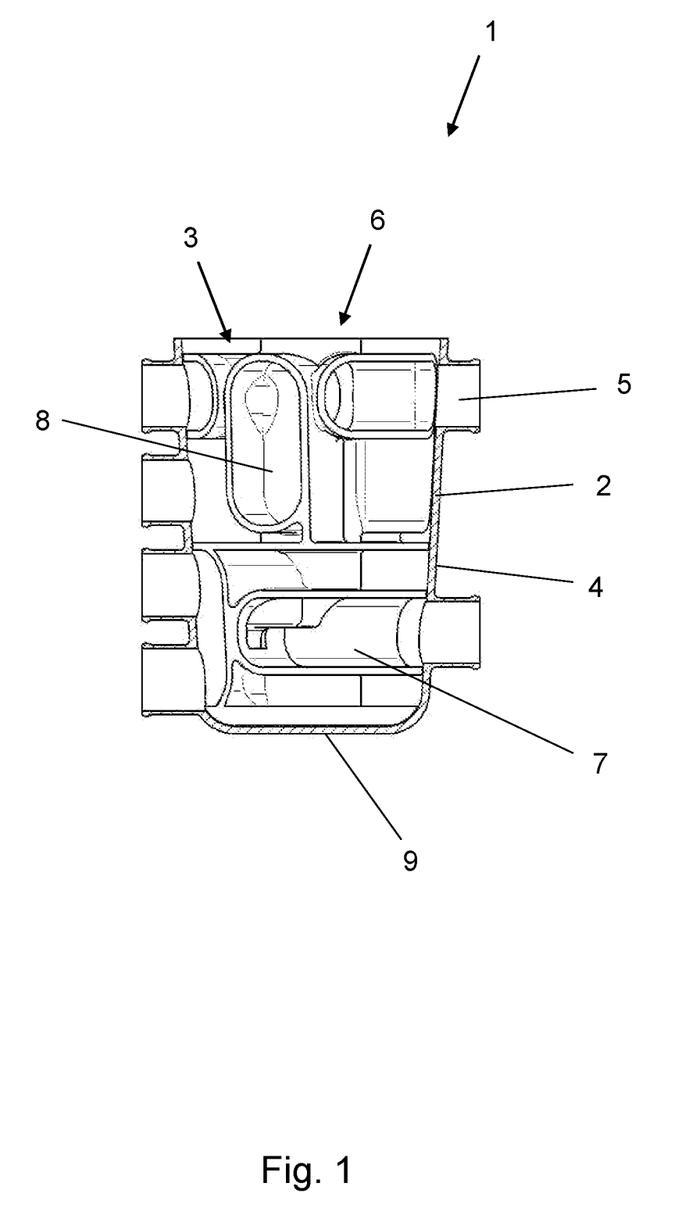
FIG. 1 a rotary valve according to the first alternative in sectional view.
Figure 2:
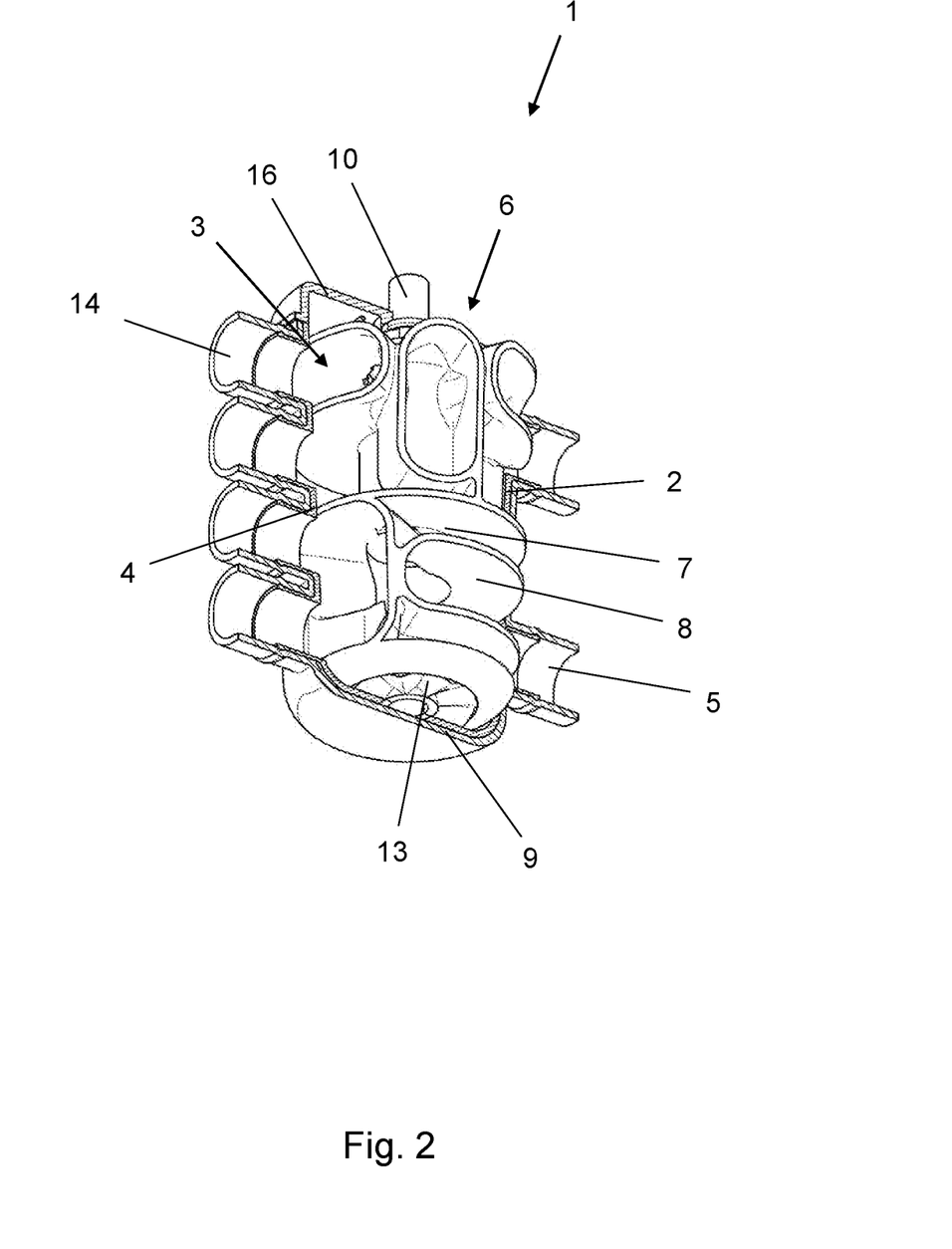
FIG. 2 a rotary valve according to the second alternative in sectional view looking at the detent arrangement.
Figure 6:
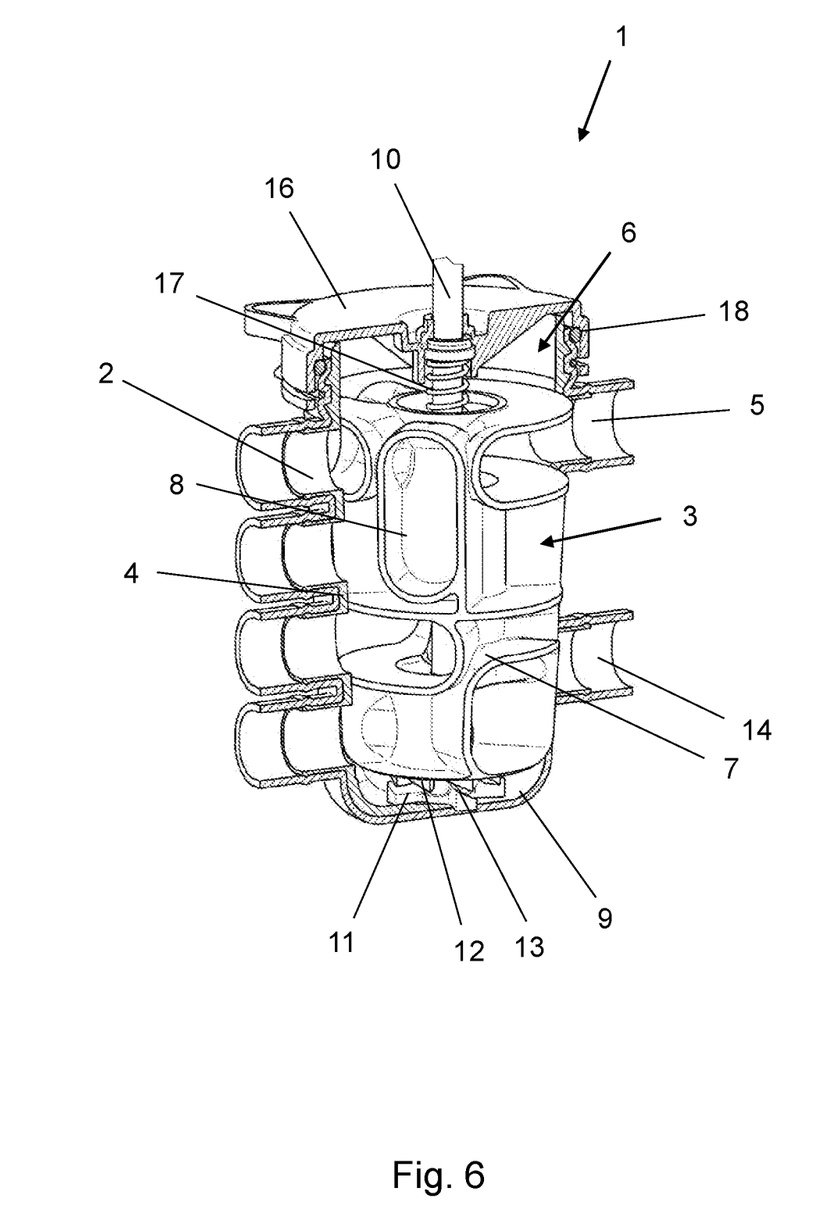
FIG. 6 a rotary valve according to the third alternative in sectional view looking at the cover.

The rotary valve 1 shown in embodiments according to FIGS. 1, 2 and 6 comprises a valve housing 2 having a valve chamber 3, wherein the valve chamber 3 has a chamber wall 4. Six fluid openings 5 are provided in the chamber wall 4. The valve chamber 3 is formed to be rotationally symmetrical and has a substantially conical chamber wall 4. A receiving opening 6 is provided in the front of the valve chamber 3, via which a valve core 7 is inserted into the valve chamber 3. The valve core 7 is provided with a channel structure 8 which interacts with the fluid openings 5. The valve core 7 is supported in a rotationally movable way in the valve chamber 3. Depending on the position of the valve chamber 3 and the channel structure 8 aligned with the fluid openings 5, different transport directions result for the fluid flowing in and out via the fluid openings 5.

The valve housing 2 is surrounded on the outside by a collector 14. The valve housing 2, the valve core 7 and the collector 14 are made of a thermoplastic material. The valve housing 2 and the valve core 7 are formed as injection moulded parts. The collector 14 is formed as a blow moulding part.

The fluid openings 5 are designed as connecting pieces. In this regard, a tubular portion of the fluid openings 5 extends into the collector 14. The collector 14 has corresponding sections, also formed as connecting pieces. These are designed to accommodate pipelines or hoses.

FIG. 1 shows a sectional view of the rotary valve 1 according to a first embodiment. From FIG. 1, it can be seen that the valve chamber 3 is formed in a conical shape. The valve core 7 is congruent with the valve chamber 3 on the outer circumference side and is thus also conical in shape. The valve chamber 3 is delimited by the chamber wall 4 and a chamber bottom 9. The chamber wall 4 surrounds the valve core 7, wherein the diameter of the chamber wall 4 widens, starting from the chamber bottom 9, in the direction of the receiving opening 6. To adjust the valve core 7 and to rotate the channel structure 8 relative to the fluid openings 5, the valve core can be moved both translationally and rotationally relative to the valve housing 2. In this case, an actuator can be brought into engagement with the valve core 7, which performs a superimposed rotational and translational movement. The translational movement creates a gap between the valve housing 2 and the valve core 7, which allows the valve core 7 to rotate relative to the valve housing 2 with low friction.

FIG. 2 shows a sectional view of the rotary valve 1 according to a second embodiment. In the design according to FIG. 2, the valve chamber 3 is also formed in a conical shape. The valve core 7 is congruent with the valve chamber 3 on the outer circumference side and is thus also conical in shape. The valve chamber 3 is delimited by the chamber wall 4 and a chamber bottom 9. The chamber wall 4 surrounds the valve core 7, wherein the diameter of the chamber wall 4 widens, starting from the chamber bottom 9, in the direction of the receiving opening 6.

The valve core 7 is supported both rotationally and translationally in the valve chamber 3. To adjust the valve core 7 and to rotate the channel structure 8 relative to the fluid openings 5, the valve core can be moved both translationally and rotationally relative to the valve housing 2.

In the present embodiment, however, only one actuator is required, which merely executes a rotational movement. To ensure that the valve core 7 simultaneously moves translationally during rotation, ramp elements 13 in the form of a circumferential mountain and valley structure are introduced into the valve housing 2 in the region of the chamber bottom 9. These form an adjusting device. The valve core 7 is provided with congruent ramp elements on the side facing the chamber bottom. During rotation, the ramp elements 13 of the valve core 7 slide against the ramp elements 13 of the valve housing 2, so that the valve core 7 also moves translationally simultaneously with the rotational movement. As soon as the valve core reaches the next position, the valve core 7 lowers again so that the valve core 7 again abuts against the chamber wall 4. The translational movement creates a gap between the valve housing 2 and the valve core 7, which facilitates rotation of the valve core 7 relative to the valve housing 2.

The receiving opening 6 of the valve housing 2 is closed by a cover 16, wherein a selector shaft 10 projects through the cover 16. The selector shaft 10 is non-rotatably connected to a rotation element 15, wherein the rotation element 15 engages into a recess 21 formed in the valve core 7. On the side of the outer circumference, the rotation element 15 has teeth which engage congruent teeth formed in the inner circumference of the recess 21, thereby enabling torque to be transmitted from the selector shaft 10 to the valve core 7. Thereby, the rotation element 15 is arranged to be translationally movable in the recess 21. By means of this design, the translational movement of the valve core 7 caused by the ramp elements 13 is not transmitted into the selector shaft 10.

A spring 17 is arranged between the cover 16 and the valve core 7, which presses the valve core 7 onto the chamber bottom 9.

Figure 3:
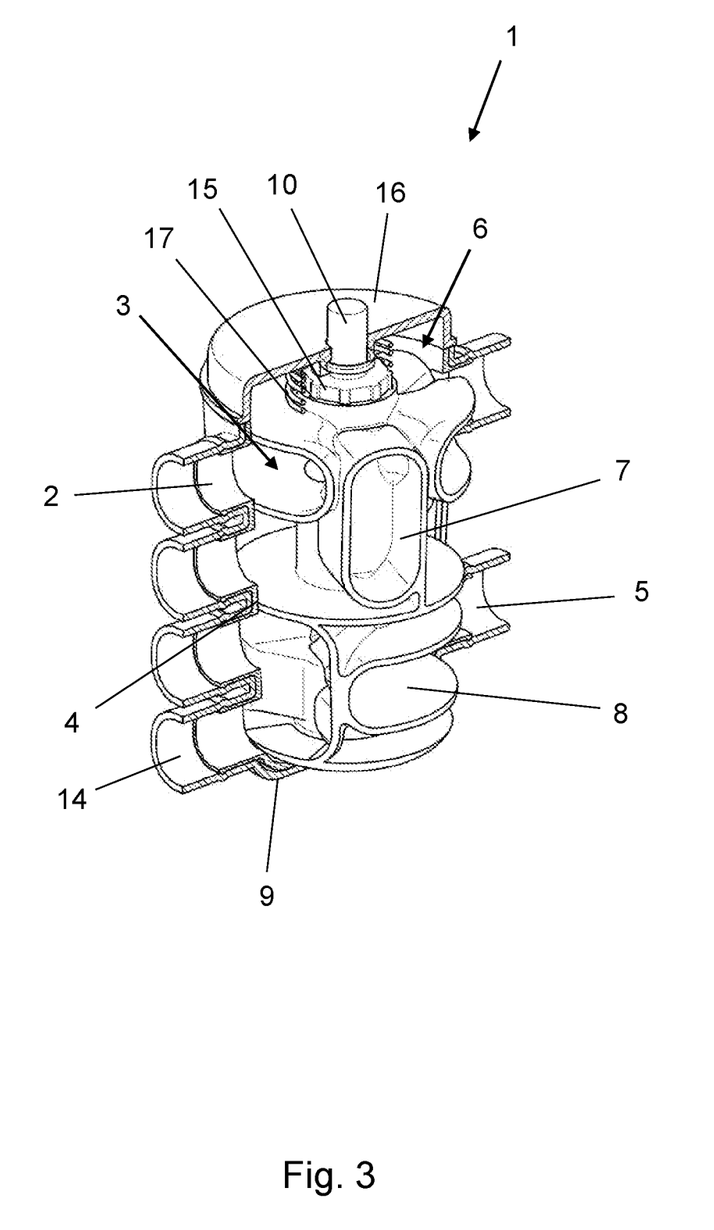
FIG. 3 the rotary valve according to FIG. 2 in sectional view, looking at the receiving opening.
Figure 4:
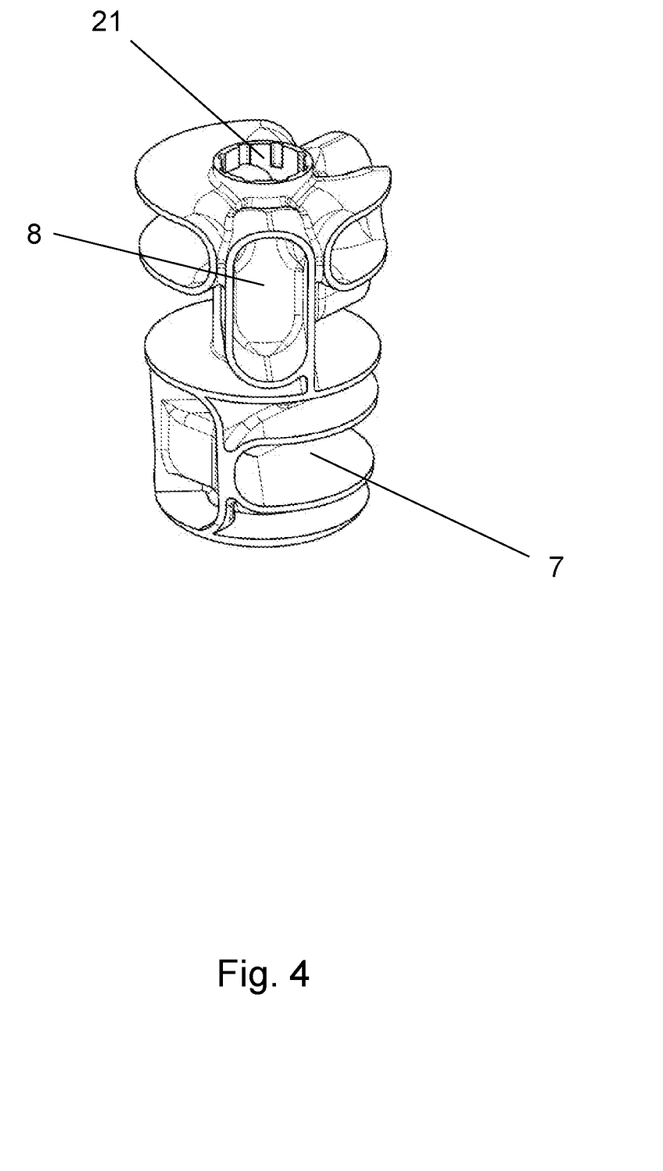
FIG. 4 in detail, the valve core of the rotary valve according to FIG. 2.
Figure 5:
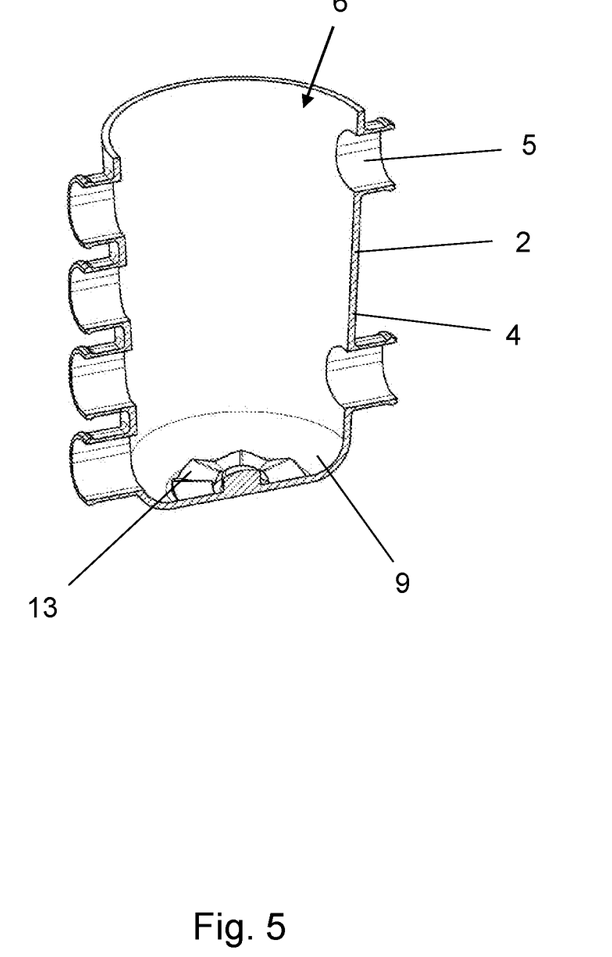
FIG. 5 in detail, the valve housing of the rotary valve according to FIG. 2 in sectional view.

FIG. 3 shows the rotary valve 1 according to FIG. 2 in section with a slanted view from above. FIG. 4 shows in detail the valve core 7 of the rotary valve 1 according to FIG. 2. FIG. 5 shows in detail the valve housing 2 of the rotary valve according to FIG. 2 in section.

FIG. 6 shows a sectional view of the rotary valve 1 according to a third embodiment. In the design according to FIG. 6, the valve chamber 3 is also formed in a conical shape. The valve core 7 is congruent with the valve chamber 3 on the outer circumference side and is thus also conical in shape. The valve chamber 3 is delimited by the chamber wall 4 and a chamber bottom 9. The chamber wall 4 surrounds the valve core 7, wherein the diameter of the chamber wall 4 widens, starting from the chamber bottom 9, in the direction of the receiving opening 6.

The valve core 7 is supported both rotationally and translationally in the valve chamber 3. To adjust the valve core 7 and to rotate the channel structure 8 relative to the fluid openings 5, the valve core can be moved both translationally and rotationally relative to the valve housing 2.

In the present embodiment, however, only one actuator is required, which only executes a translational movement.

A bore extending in the axial direction is provided in the central axis of the valve core 7, which accommodates a selector shaft 10. In the region of the chamber bottom 9, the selector shaft 10 is provided with a first detent arrangement 11. For this purpose, the first detent arrangement 11 is star-shaped and has ramp elements 13 projecting radially from the selector shaft 10. These abut against the valve core 7 on the side of the valve core 7 facing the chamber bottom 9. A second detent arrangement 12 is formed on the valve core 7 in the corresponding region. This also includes ramp elements 13.

The valve core 7 is translationally and rotationally movable relative to the selector shaft 10. Relative to the valve housing 2, the selector shaft 10 is only translationally movable. A cruciform centring pin 19 is formed from the chamber bottom 9 for cantering the selector shaft 10, wherein the cruciform configuration simultaneously prevents rotation of the selector shaft 10. A third detent arrangement 20 is formed from the chamber bottom, which also includes ramp elements 13.

The receiving opening 6 of the valve housing 2 is closed by a cover 16, with the selector shaft 10 projecting through the cover 16. A spring 17 is arranged between the cover 16 and the valve core 7, which presses the valve core 7 onto the chamber bottom 9. A seal 18 in the form of an O-ring is arranged between the cover 16 and the valve housing 2. A further sealing element is arranged between the cover 16 and the selector shaft 10, wherein the further sealing element seals the passage of the selector shaft 10 through the cover 16.

In the present embodiment, the cover 16 is held on the valve housing 2 by a force/form fit. In alternative embodiments, the cover 16 may also be fixed to the valve housing 2 by a substance-to-substance bond. A substance-to-substance bond can be made, for example, by welding or gluing. In this embodiment, no separate seal is required between the valve housing 2 and the cover 16.

A rotation of the valve core 7 relative to the valve housing 2 is effected by translationally moving the selector shaft 10. In doing so, the selector shaft 10 lifts the valve core 7, and the first detent arrangement 11 and the second detent arrangement 12 abut against each other. When the valve core 7 is raised to the point where the edges of the first detent arrangement 11 and the third detent arrangement 20 facing each other are aligned, the valve core 7 slides along the slopes of the first detent arrangement 11 and the third detent arrangement 20 via its second detent arrangement 12 by a superimposed translational and rotational movement, biased by the spring 17, so that the channel structure 8 associated with the fluid openings 5 changes. In this case, the extent of the rotational movement depends on the design of the slope of the ramp elements 13. The angle about which the valve core 7 rotates is thereby predetermined by the design of the detent arrangements 11, 12, 20. These are aligned with the channel structure 8 such that each position corresponds to a desired positioning of the channel structure 8 relative to the fluid openings 5.

Figure 7:
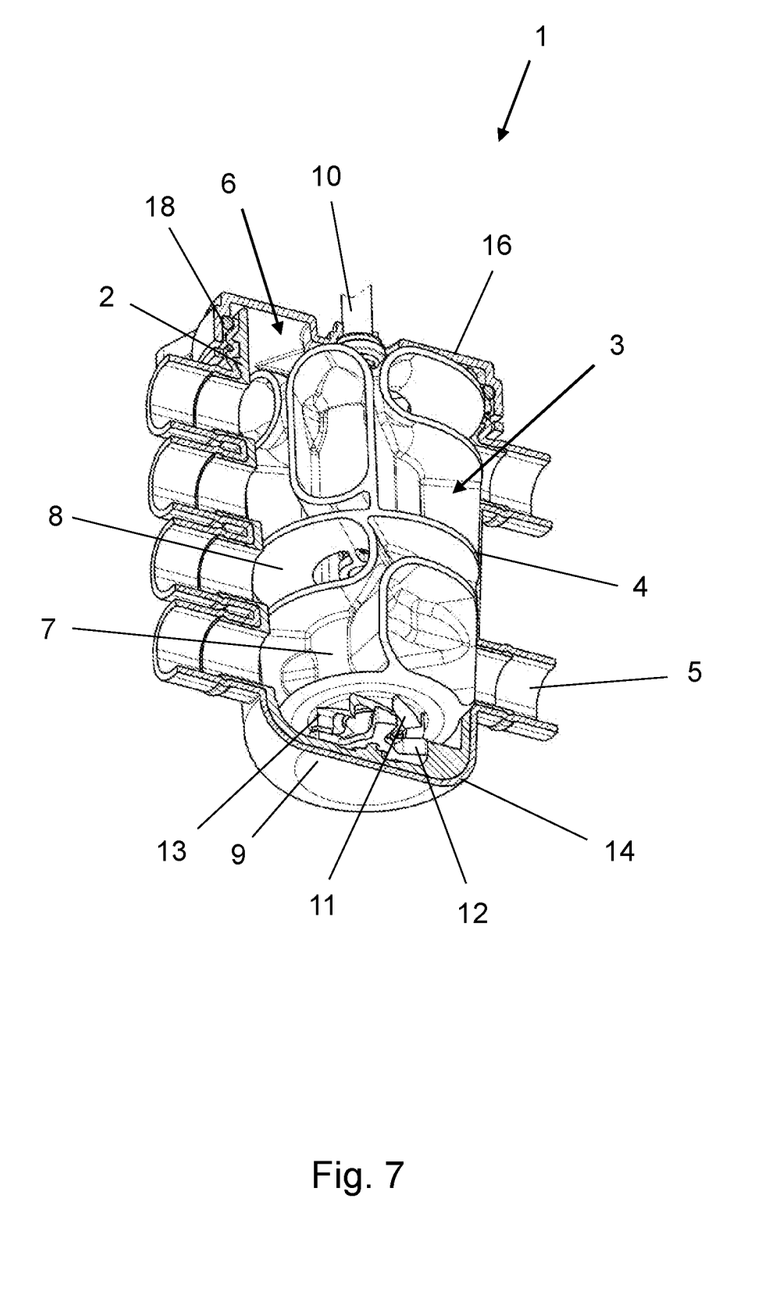
FIG. 7 a rotary valve according to FIG. 6 in sectional view, looking at the detent assembly.
Figure 8:
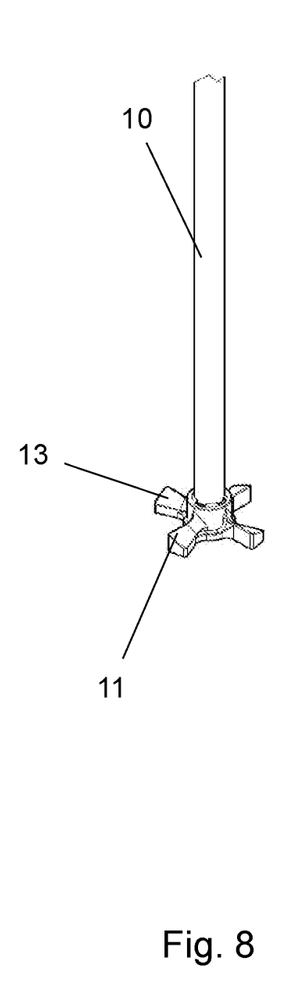
FIG. 8 in detail, the selector shaft of the rotary valve according to FIG. 6.
Figure 9:
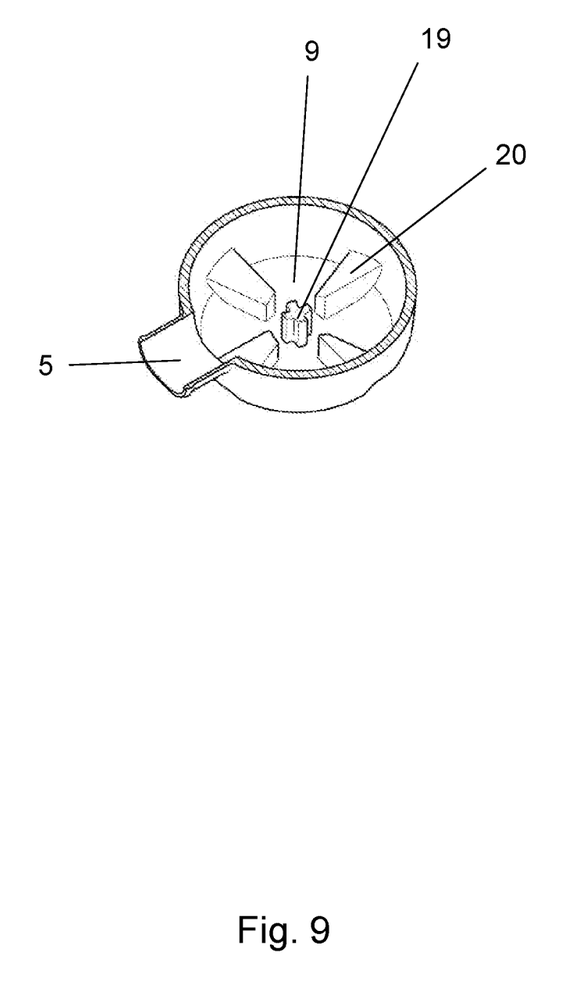
FIG. 9 in sectional view, the valve housing of the rotary valve according to FIG. 6 in the region of the chamber bottom.
Figure 10:
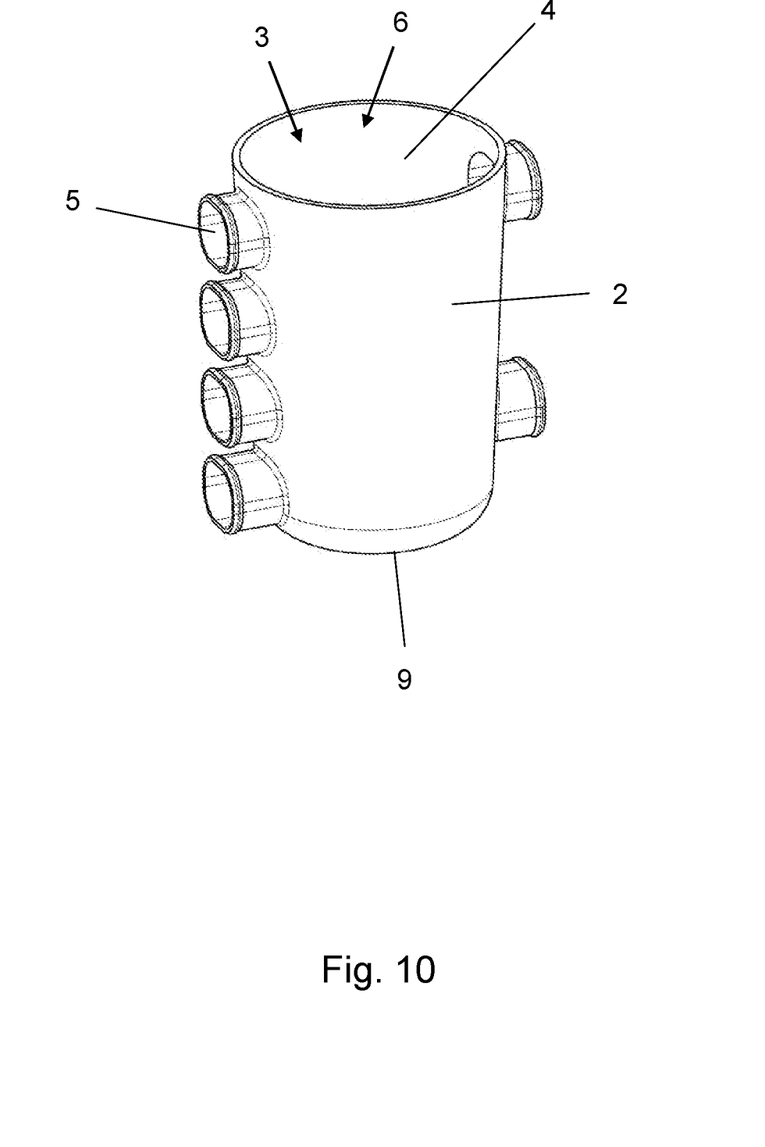
FIG. 10 in detail, the valve housing of the rotary valve according to FIG. 6.
Figure 11:
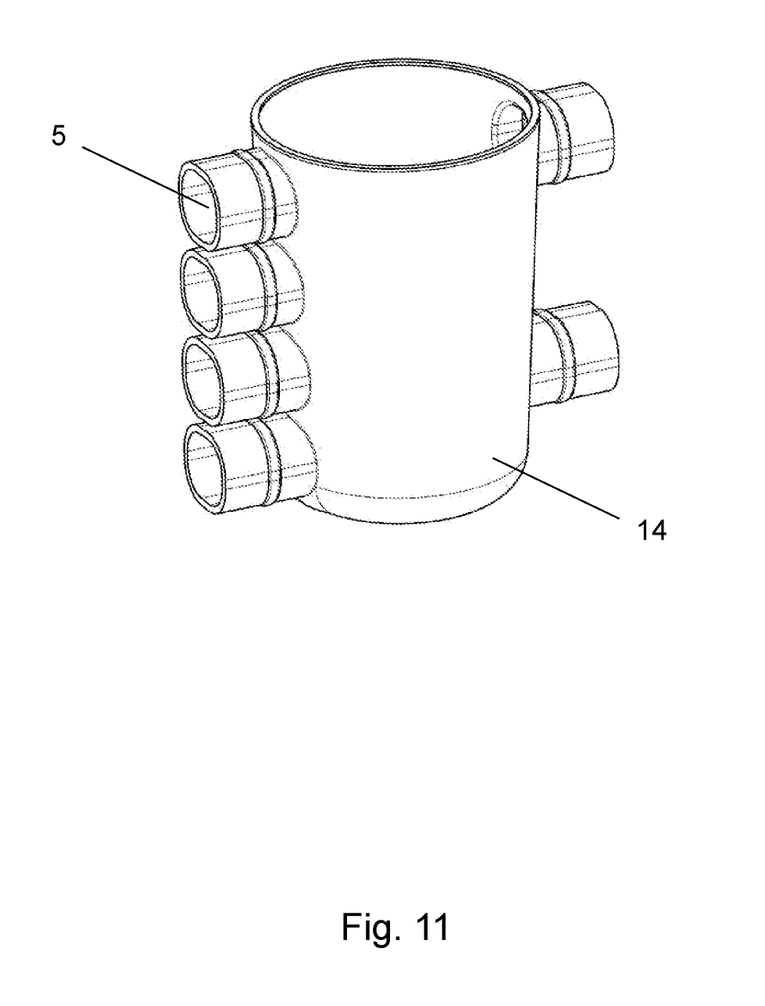
FIG. 11 in detail, the collector of the rotary valve according to FIG. 6.

FIG. 7 shows the rotary valve according to FIG. 6 in section from below in a slanted view. FIG. 8 shows in detail the selector shaft 10 of the rotary valve 1 according to FIG. 6. FIG. 8 shows in section the valve housing 2 of the rotary valve 1 according to FIG. 6 in the region of the chamber bottom 9. FIG. 10 shows in detail the valve housing 2 of the rotary valve 1 according to FIG. 6, and FIG. 11 shows in detail the collector 14 of the rotary valve 1 according to FIG. 6.

The invention claimed is:

1. A rotary valve comprising:
a valve housing with a valve chamber, wherein the valve chamber has a chamber wall in which at least two fluid openings are provided, wherein the valve chamber has a receiving opening on an end face side, wherein the valve chamber is delimited by the chamber wall and a chamber bottom, wherein the chamber wall surrounds the valve core, wherein the chamber bottom includes chamber ramp elements,
a valve core accommodated in the valve chamber, wherein the valve core is provided with a channel structure which interacts with the fluid openings, wherein the valve core is supported in the valve chamber in a translationally and rotationally movable manner, wherein the valve core includes core ramp elements in abutment with the chamber ramp elements, and
a selector shaft non-rotatably connected to the valve core for rotation therewith, the valve core translationally moveable relative to the selector shaft,
wherein the valve chamber is formed in a conical shape.

2. The rotary valve according to claim 1, wherein the valve core is formed in a conical shape on a side of an outer circumference.

3. The rotary valve according to claim 1, wherein a diameter of the chamber wall widens, starting from the chamber bottom, in the direction of the receiving opening.

4. The rotary valve according to claim 3, wherein the chamber ramp elements and the core ramp elements form an adjusting device positioned between the chamber bottom and a section of the valve core facing the chamber bottom.

5. The rotary valve according to claim 3, wherein a spring is provided which automatically presses the valve core against the chamber bottom.

6. The rotary valve according to claim 1, wherein rotation of the selector shaft causes a superimposed rotational and translational movement of the valve core relative to the valve housing.

7. The rotary valve according to claim 1, wherein the valve housing is surrounded on the outside by a collector.

8. The rotary valve according to claim 1, wherein the valve housing, the valve core and/or the collector are formed of plastic.

9. The rotary valve according to claim 1, wherein the fluid openings are formed as connecting pieces.

10. A temperature control circuit comprising at least one rotary valve according to claim 1.

11. A rotary valve comprising:
a valve housing with a valve chamber, wherein the valve chamber has a chamber wall in which at least two fluid openings are provided, wherein the valve chamber has a receiving opening on an end face side, wherein the valve chamber is delimited by the chamber wall and a chamber bottom, wherein the chamber wall surrounds the valve core, wherein the valve chamber is formed in a conical shape,
a valve core accommodated in the valve chamber, wherein the valve core is provided with a channel structure which interacts with the fluid openings, wherein the valve core is supported in the valve chamber in a translationally and rotationally movable manner, wherein the valve core includes a bore extending axially therethrough to the chamber bottom, and
wherein the valve core accommodates a selector shaft, the selector shaft passing through the bore in the valve core, the valve core translationally moveable relative to the selector shaft, wherein the selector shaft is provided with a first detent arrangement and the valve core is provided with a second detent arrangement, wherein the first detent arrangement and the second detent arrangement are operatively connected.

12. The rotary valve according to claim 11, wherein the selector shaft is rotationally and/or translationally movable.

13. The rotary valve according to claim 11, wherein the chamber bottom is provided with a third detent arrangement, wherein the valve core slides along the first detent arrangement and the third detent arrangement via its second detent arrangement.

14. The rotary valve according to claim 13, wherein the first detent arrangement and the second detent arrangement cause a superimposed rotational and translational movement of the valve core relative to the valve housing.

15. The rotary valve according to claim 13, wherein the first detent arrangement is star-shaped and has ramp elements projecting radially from the selector shaft.

* * * * *